United States Patent [19]

English et al.

[11] Patent Number: 5,272,941
[45] Date of Patent: Dec. 28, 1993

[54] CABLE SEVERING AND STRIPPING APPARATUS

[75] Inventors: Anthony T. English, San Clemente; Norris J. Cole, San Juan Capistrano, both of Calif.

[73] Assignee: Western Electronic Products, San Clemente, Calif.

[21] Appl. No.: 16,037

[22] Filed: Feb. 10, 1993

[51] Int. Cl.⁵ .............................................. H02G 1/12
[52] U.S. Cl. ...................................................... 81/9.51
[58] Field of Search ................................. 81/9.51, 9.4

[56] References Cited

U.S. PATENT DOCUMENTS

| | | | |
|---|---|---|---|
| 3,153,358 | 10/1964 | Havens | 81/9.51 |
| 3,659,332 | 5/1972 | Morrone | 81/9.51 |
| 3,909,911 | 10/1975 | Smith et al. | 81/9.51 |
| 4,999,910 | 3/1991 | Cross | 29/825 |
| 5,111,720 | 5/1992 | Stepan | 81/9.51 |

*Primary Examiner*—Roscoe V. Parker

[57] ABSTRACT

A cable severing and stripping apparatus is disclosed having cable supporting, cutting and stripping devices for providing cable preparation for use. Energy is transmitted transversely through the cable passing through each layer interface. Echoes of the energy as it passes the layer interfaces are received at the surface of the cable. The time to pass through each of the layers is recorded and the thickness of each of the layers is then determined. A severing device is then controlled to the determined depth of cut to assure proper layer cutting without over or under cutting.

5 Claims, 1 Drawing Sheet

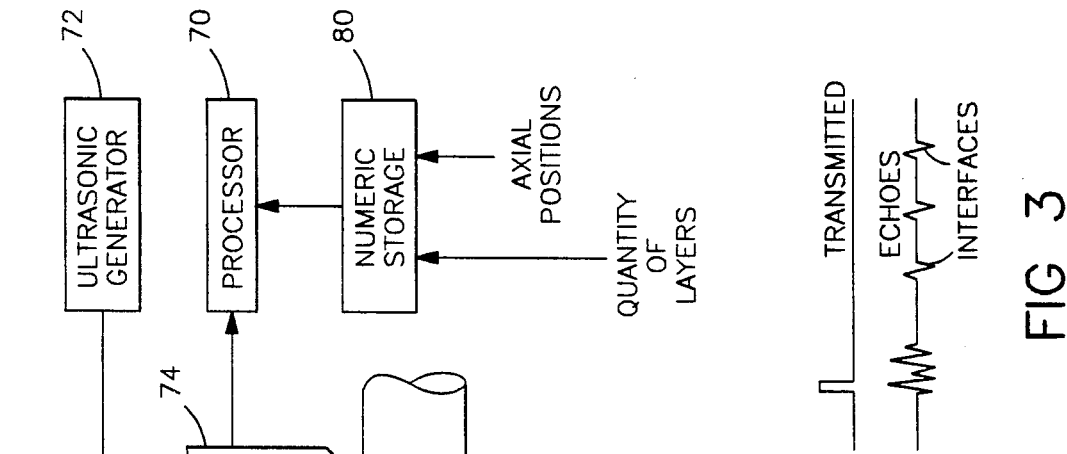
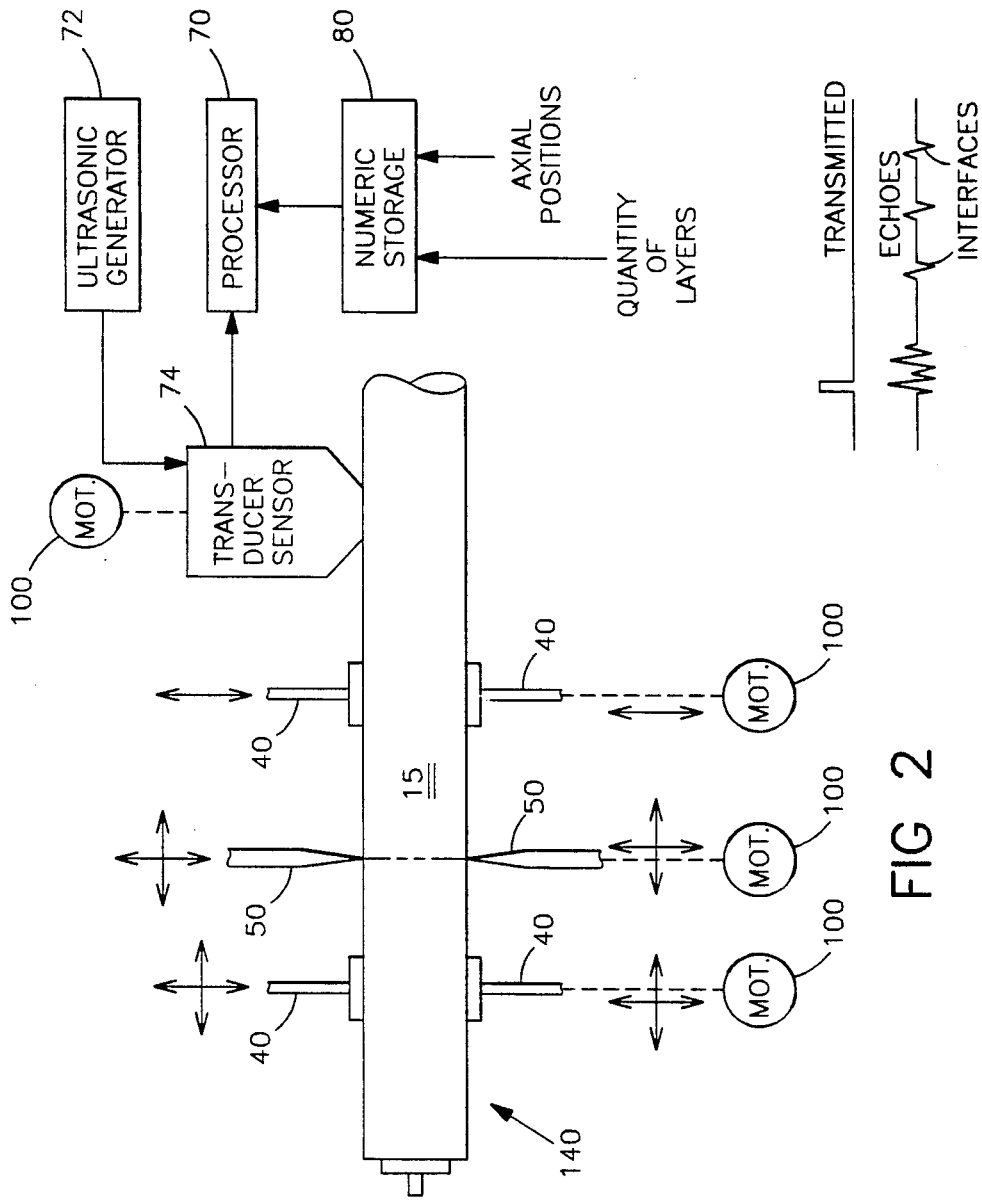
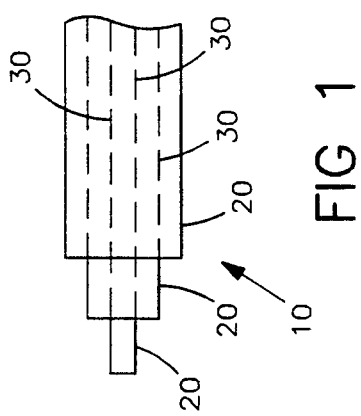

CABLE SEVERING AND STRIPPING APPARATUS

FIELD OF THE INVENTION

This invention relates generally to cable and wire stripping machines, and, more particularly, to an apparatus for automatic measurement of depth of cut and execution of severing and stripping in a multi-layer cable through the use of energy transmission.

BACKGROUND OF THE INVENTION

There is clearly a need for automated cable cutting and stripping operations in industry. The art is defined by Havens, U.S. Pat. No. 3,153,332, Morrone, U.S. Pat. No. 3,659,911, Smith et al., U.S. Pat. No. 3,909,911, Cross, U.S. Pat. No. 4,999,910, and most recently by Stepan, U.S. Pat. No. 5,111,720. These prior art references clearly teach how to hold, grip, move, cut and strip wire and cable of all kinds. Of particular interest is Morrone and Smith which each teach the use of energy applied to the cable for cleaning off plastic insulators and Cross which teaches the use of electrical conduction to sense when the insulation is fully cut. The Stepan reference teaches the use of an electronic storage device to hold the information necessary to control the radial positions of an insulation cutter.

These teachings do not show a means for determining the thickness to be cut "on-the-fly", as it were. For instance the Stepan machine requires knowing before hand, what thickness the layers to be cut will be, and to install this information into a storage device before cutting operations start. This may sometimes be acceptable when large lot cutting is to be done, but does not meet the needs of short runs and odd jobs, and when cable thicknesses vary frequently within lots and between lots or when cable tolerences are large.

A further disadvantage that appears frequently in real situations, when prior art stripping apparatus and methods are used, is the failure to make correct readings in printed reference materials, failure to properly label cable so that the associated reference is unknown, and the failure to properly convert between systems of measurement units. These problems result in delays on the shop floor and in poor quality results.

Clearly, then, there is a need for an improved cable and wire stripping apparatus that overcomes the above difficulties. Such a needed apparatus is described in the following summary and detailed description and is based upon principles which are defined in the appended claims.

SUMMARY OF THE INVENTION

The cable severing and stripping apparatus disclosed herein includes a cable supporting device for holding the cable in a fixed position during the severing operation and possibly also for stripping of the severed layers from the cable. A severing device engages the cable for cutting into selected layers of the cable starting at the outer surface. An electronic device preferably a digital numeric processor, is provided which takes a stored number as input, the number being the number of layers to be cut. A device for measuring the depth of cut from the outer surface of any one exposed layer to the target layer interface, and a device for controlling the severing device to execute the severing process to the measured depth of cut is provided. The device for measuring the depth of cut may include a device for transmitting ultrasonic energy pulses through the cable, or other form of energy may be used. With ultrasonic energy a device for receiving echo pulses from the passing of the transmitted pulses across the layer interfaces, as well as a device for measuring time delays between the transmitted pulses and the associated echo pulses and a device for calculating the depth of cut from the time delays is provided. Other devices for cutting in multiple locations and for stripping the cut portions are included in the present disclosure.

The advantage of the instant apparatus is clear in that one need not know the exact thickness of the cable to be cut. One need only know which layers of insulation and or conductor, shield, braid, etc. are to be cut through. The thickness of cut is automatically determined and executed. If thicknesses vary, the apparatus automatically compensates. If cutting is to be made down to the third layer, for instance, any number of different cables can be stripped even though each cable is of a different diameter and has layers of different thicknesses.

The present cable severing and stripping apparatus may be constructed in accordance with many different possible mechanical assembly and component schemes. Of particular interest is the mechanism of the Stepan patent previously described for its value in organizing and controlling the necessary well known methods of holding, cutting and stripping actions with respect to electrical cables. In accordance therefore, since many of these well known approaches may also be used with this current disclosed apparatus, for the simple mechanical enablement, the issued patent of Stepan, U.S. Pat. No. 5,111,720 is hereby incorporated into this application by reference.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is an illustration of a typical cable for use with the apparatus of the invention.

FIG. 2 is a schematic diagram of the apparatus.

FIG. 3 is a signal representation showing the appearance of the transmitted pulse and its echoes.

DETAILED DESCRIPTION OF THE PREFERRED EMBODIMENT

FIG. 1 illustrates a cable 10 which is, most generally, made up of multiple layers 20 of electrical insulation and conducting materials. Being that each of the layers 20 lies in contact with an adjacent layer 20, a layer interface 30 is defined between each adjacent pair of layers 20. The apparatus of FIG. 2 includes a movable cable supporting or clamping means 40 for holding the cable in a fixed position during the severing operation and also for helping to strip the severed layers from the cable. A severing means 50 engages the cable for producing a radial plane discontinuity in selected layers of the cable starting at the outer surface 15 of the cable 10 at a selected point 60 along the length of the cable 10. Provided also are an electronic means 70, preferably a digital numeric processor, and a number storing means 80 capable of receiving numerical input for representing a number of the layers 20 which are to be severed as a target objective in the severing process. The target is further defined as a depth of cut in the cable, said depth being measured from the outer surface 15 of the cable 10 or of the outer remaining exposed layer, transversely to a target layer interface determined by the input quantity of layers number, which depth results in the severing of the target number of layers 20. The target quantity of the layers 20 defines the target interface.

The measurement of the depth of cut from the outer surface 15 of any one exposed layer 20 transversely to the target layer interface, is achieved by producing ultrasonic pulses by a generator 72 and transmitting these pulses transversely into the cable 10 by a transducer/sensor 74 which is bought into contact with the cable 10 by a control means 100, preferably a stepping motor control with stepping motors for up to three axis of motion control. The transducer/sensor 74 picks up all echoes of the transmitted pulses which are generated by pulses passing across the layer interfaces 30. The electronic processor 70 serves to measure time delays between the transmitted pulses and the associated echo pulses and calculate the depth of cut from the time delays. Since the speed of sound in any material can be determined to a high degree of accuracy, the utilization of layer interface echo timing to determine the depth of cut within close tolerence is an extremely viable technique. At least two different axial positions on the cable 10 may be selected and programmed into the numeric storage device 80. Control 100 positions the severing means axially and controls cutting to the measured depth of cut to enable the realization of a radial plane discontinuity in the target layers 20 of the cable 10.

The clamping means 40 and another of the control means 100 provide cable position actuating means for moving the cable for further cuts and for stripping the severed portions of the cable 140. The stripping means may be a pneumatic or other servo-control device for moving the cable with respect to the severing means or vice versa so that the severed portion 140 is pulled off the cable 10.

FIG. 3 is a signal representation showing the appearance of the transmitted pulse and its echoes in time phase. The echoes indicate where layer interfaces exist. Echo pulse time arrival with respect to the original pulse give an exact determination of

What is claimed is:

1. Apparatus for severing at least one layer of a cable having multiple layers, each one of the layers defining a layer interface with each one of the layers adjacent layers, comprising:
   cable supporting means for holding the cable in a fixed position for severing;
   severing means for engaging the cable such that a radial plane discontinuity is produced by the severing means at, a point along the length of the cable in at least one of the layers;
   electronic means having means for storing a number, the number representing the quantity of the layers in the cable that are to be severed thereby defining a target layer interface to cut down to, and energy propagating means for measuring a depth of cut from an exposed outer surface of any one of said layers to the target layer interface, and means for controlling the severing means to execute a depth of cut equal to said measured depth of cut to enable the radial plane discontinuity for severing of said quantity of layers of the cable.

2. The apparatus of claim 1 further including a severing means position actuating means for moving the severing means axially with respect to the cable to at least two different selectable axial positions on the cable for providing multiple severing executions by the severing means on the cable.

3. The apparatus of claim 1 further including a cable position actuating means for moving the cable axially with respect to the severing means to at least two different selectable axial positions on the cable for providing multiple severing executions by the severing means on the cable.

4. The apparatus of claim 1 wherein the means for measuring said depth of cut includes means for transmitting ultrasonic energy pulses transversely through the cable, means for receiving echo pulses from the passing of the transmitted pulses across said layer interfaces, means for measuring time delays between the transmitted pulses and the associated echo pulses and means for calculating the depth of cut from the time delays.

5. The apparatus of claim 1 further including a stripping means for removing the severed layers from the cable.

* * * * *